(12) United States Patent
Mikawa et al.

(10) Patent No.: US 10,789,716 B2
(45) Date of Patent: Sep. 29, 2020

(54) IMAGE PROCESSING APPARATUS AND METHOD OF CONTROLLING THE SAME AND RECORDING MEDIUM

(71) Applicant: CANON KABUSHIKI KAISHA, Tokyo (JP)

(72) Inventors: Chiaki Mikawa, Yokohama (JP); Yosato Hitaka, Tokyo (JP); Fumiaki Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 16/184,521

(22) Filed: Nov. 8, 2018

(65) Prior Publication Data

US 2019/0156488 A1    May 23, 2019

(30) Foreign Application Priority Data

Nov. 17, 2017 (JP) .................................. 2017-221612
Oct. 25, 2018 (JP) .................................. 2018-201268

(51) Int. Cl.

| G06T 7/60 | (2017.01) |
|---|---|
| G01D 13/02 | (2006.01) |
| G06T 7/136 | (2017.01) |
| G01D 9/42 | (2006.01) |
| G06T 7/13 | (2017.01) |
| G06T 7/70 | (2017.01) |
| G06T 7/73 | (2017.01) |
| G01D 13/00 | (2006.01) |

(52) U.S. Cl.
CPC .................. *G06T 7/13* (2017.01); *G06T 7/60* (2013.01); *G06T 7/70* (2017.01); *G06T 7/73* (2017.01); *G01D 9/42* (2013.01); *G01D 13/00* (2013.01); *G01D 13/02* (2013.01); *G06T 7/136* (2017.01); *G06T 2207/20092* (2013.01)

(58) Field of Classification Search
CPC .......... G01D 13/00; G01D 13/02; G01D 9/42; G01D 5/39; G06T 7/13; G06T 7/136; G06T 7/60; G06T 7/73; G06K 2209/03
See application file for complete search history.

(56) References Cited

U.S. PATENT DOCUMENTS 5,013,154 A * 5/1991 Kominsky ............. G01D 4/008
                                                               348/160
2001/0055425 A1* 12/2001 Chiu .................... G06K 9/4633
                                                               382/199

(Continued)

FOREIGN PATENT DOCUMENTS

JP       2004-133560 A       4/2004

*Primary Examiner* — David Bilodeau
(74) *Attorney, Agent, or Firm* — Canon U.S.A., Inc. IP Division

(57) ABSTRACT

An apparatus captures an image of a measuring instrument that is captured by an imaging apparatus, sets an area in the image as an edge detection processing target in response to a user operation, and executes edge detection processing on the set area in the image. Further, the image processing apparatus sets a value for correcting a position of a detected edge portion. The image processing apparatus corrects the position of the detected edge portion based on the set value and calculates a value indicated by a pointer of the measuring instrument according to the corrected position of the edge portion.

21 Claims, 15 Drawing Sheets

(56) References Cited

U.S. PATENT DOCUMENTS

| | | | |
|---|---|---|---|
| 2006/0036967 A1* | 2/2006 | Crichlow | G01D 5/39 715/781 |
| 2008/0048879 A1* | 2/2008 | Lipman | B60K 37/02 340/688 |
| 2008/0205747 A1* | 8/2008 | Kuchii | G06T 7/0004 382/149 |
| 2016/0086031 A1* | 3/2016 | Shigeno | G06K 9/00624 382/103 |
| 2019/0385294 A1* | 12/2019 | Yasukawa | G06T 7/0002 |

* cited by examiner

FIG.1
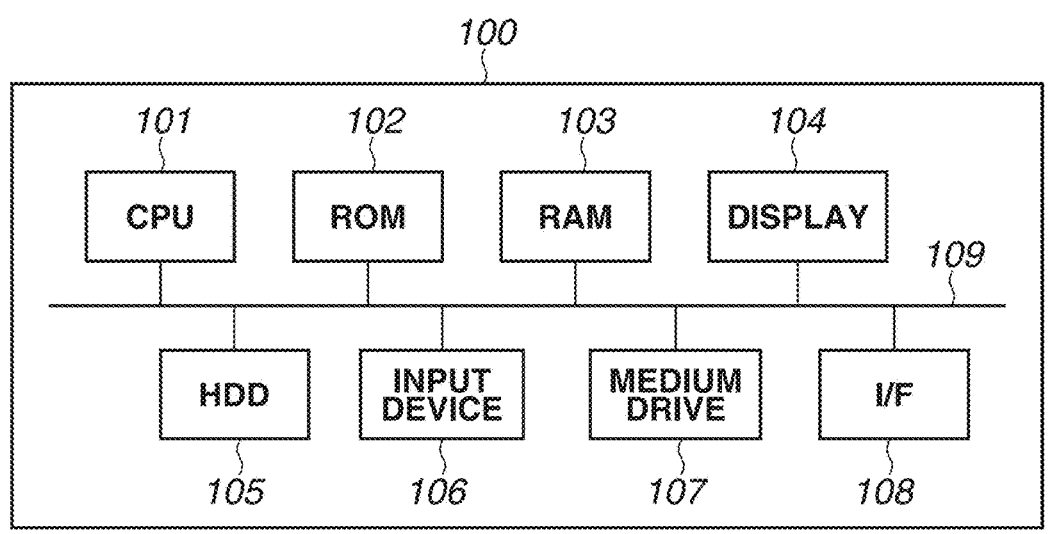
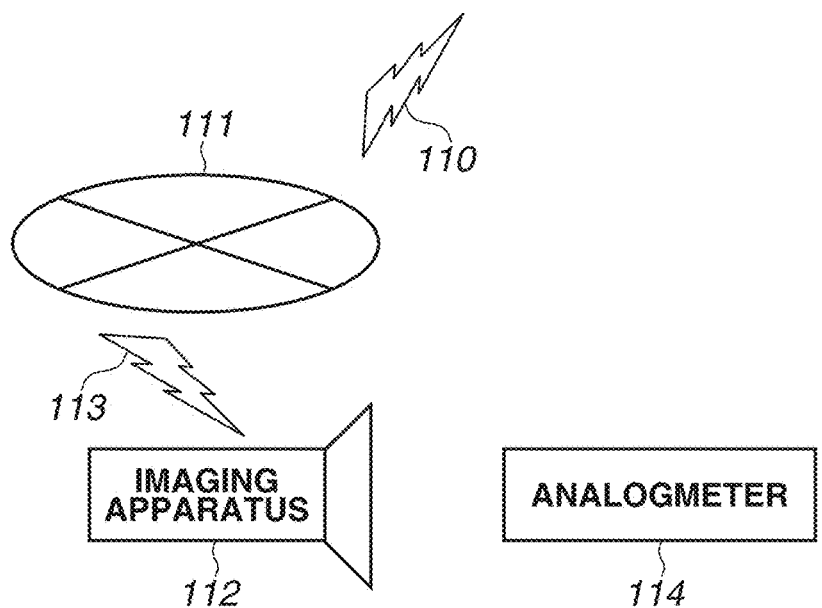

IMAGE PROCESSING APPARATUS AND METHOD OF CONTROLLING THE SAME AND RECORDING MEDIUM

BACKGROUND OF THE INVENTION

Field of the Invention

The aspect of the embodiment relates to an image processing apparatus for processing a captured image of a measuring instrument and reading a value indicated by a pointer of the measuring instrument, a method of controlling the measuring instrument, and a recording medium.

Description of the Related Art

Conventionally, a technique is used in which an imaging apparatus captures an image of an analogmeter configured to measure a physical quantity, such as a temperature, a pressure, the number of rotations, a current, or a voltage, and the captured image is analyzed to output the value indicated by a pointer needle of the analogmeter (discussed in Japanese Patent Application Laid-Open No. 2004-133560).

The technique discussed in Japanese Patent Application Laid-Open No. 2004-133560 does not consider the shape of the pointer needle, and there are cases in which erroneous edge detection occurs due to the thickness, pattern, etc. of the pointer needle to make it difficult to obtain a correct measurement value.

SUMMARY OF THE INVENTION

According to an aspect of the embodiments, an image processing apparatus includes an acquisition unit configured to acquire an image of a measuring instrument that is captured by an imaging apparatus, a first setting unit configured to set an area in the image as an edge detection processing target in response to a user operation, a detection unit configured to execute edge detection processing on the set area in the image, a second setting unit configured to set a value for correcting a position of a detected edge portion, a correction unit configured to correct the position of the detected edge portion based on the value, and a calculation unit configured to calculate a value indicated by a pointer of the measuring instrument according to the corrected position of the edge portion.

Further features of the disclosure will become apparent from the following description of exemplary embodiments with reference to the attached drawings.

BRIEF DESCRIPTION OF THE DRAWINGS

FIG. 1 illustrates an example of a configuration of an entire system according to an exemplary embodiment of the disclosure.

DESCRIPTION OF THE EMBODIMENTS

Figure 2:
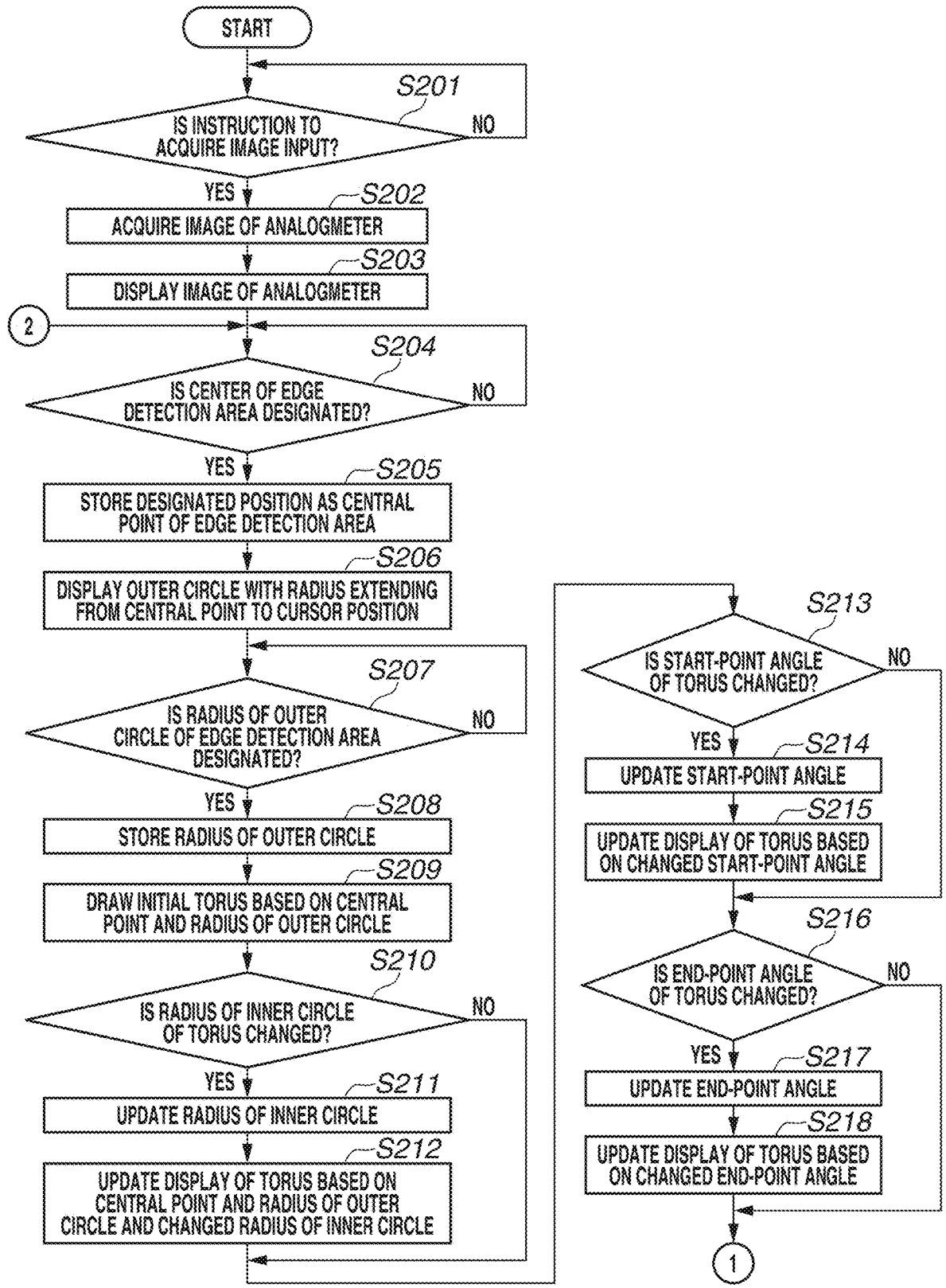
FIG. 2 is a flowchart illustrating an example of operations of an image processing apparatus in a setting mode according to an exemplary embodiment of the disclosure.

Various exemplary embodiments of the disclosure will be described in detail below with reference to the drawings. It should be noted that the components described in the exemplary embodiments are mere examples and are not intended to limit the scope of the invention.

In an exemplary embodiment of the disclosure, an image processing apparatus will be described below that reads a measurement value according to a pointer of a circular analogmeter (round measuring instrument) that specifies a physical quantity such as a temperature, a pressure, the number of rotations, a current, or a voltage.

<System Configuration>

FIG. 1 illustrates a configuration of an entire system including an image processing apparatus 100 according to the present exemplary embodiment. In FIG. 1, the image processing apparatus 100 is implemented by a computer apparatus and executes a predetermined control program to perform image processing described below. A control unit 101 controls the entire image processing apparatus 100 and is implemented by, for example, a central processing unit (CPU). A read-only memory (ROM) 102 stores operation processing procedures (e.g., a program for computer activation processing, basic input/output processing, etc.) of the control unit 101. A random access memory (RAM) 103 functions as a main memory of the control unit 101. Various programs including a control program for realizing a process described below are loaded onto the RAM 103 from a hard disk drive (HDD) 105, etc. and executed by the control unit 101. Further, the RAM 103 provides a work area when the control unit 101 executes various types of processing. A display 104 performs various types of displaying under the control by the control unit 101. The HDD 105 is used to save and read application programs, data, libraries, etc. An input device 106 is implemented by a pointing device, a keyboard, etc. and used for data input according to user operations. A storage medium mounting unit (medium drive) 107 enables mounting a removable storage medium and reading data captured and stored in the storage medium by an imaging apparatus 112. A network interface 108 is connected to a network 111 via a communication line 110. Data is transmitted and received to and from an external device that is communicable via the network interface 108. In the present exemplary embodiment, the image processing apparatus 100 is connected with the imaging apparatus 112 via the network interface 108, and the control unit 101 transmits an image capturing instruction to the imaging apparatus 112. A captured image is acquired by the control unit 101, and recorded in the HDD 105. A system bus 109 connects the above-described units and is composed of an address bus, a data bus, and a control bus.

The imaging apparatus 112 acquires image data by capturing an image of an object, and is implemented by an electronic device having an imaging unit, such as a digital still camera, a digital movie camera, or a monitoring camera. The imaging apparatus 112 is connected to the network 111 via a communication circuit 113 to be communicable with the image processing apparatus 100. An analogmeter 114 measures a physical quantity of, for example, temperature, pressure, number of rotations, current, and voltage, and specifies a measurement value with a pointer.

The image processing apparatus 100 in the present exemplary embodiment operates in two modes, a setting mode and an operation mode, to realize the reading of the measurement value of the analogmeter 114. In the setting mode, various types of information are preset to realize the reading of the measurement value of the analogmeter 114 according to an image of the analogmeter 114 that is captured by the imaging apparatus 112. On the other hand, in the operation mode, image data of the analogmeter 114 captured by the imaging apparatus 112 is analyzed, and the measurement value of the analogmeter 114 is calculated based on the various types of information set in the setting mode.

In the present exemplary embodiment, the image to be processed is a non-compressed or decompressed 8-bit depth gray-scale image. Thus, the imaging apparatus 112 converts the image data acquired by capturing an image of the analogmeter 114 into gray-scale image data, and transmits the converted gray-scale image data to the image processing apparatus 100 via the network 111. Alternatively, the imaging apparatus 112 may transmit original image data to the image processing apparatus 100 and the image processing apparatus 100 may convert the image data into gray-scale image data. The image processing apparatus 100 stores the gray-scale image data, a processing target in the present exemplary embodiment, in the HDD 105.

<Processing in Setting Mode>

A Process in the setting mode performed in the image processing apparatus 100 in the present exemplary embodiment will be described below with reference to the drawings.

The control unit 101 of the image processing apparatus 100 reads and starts an application program for executing analogmeter reading processing from the HDD 105. The control unit 101 executes operations described below according to an operating system (OS) and the application program.

When the application program is activated, the control unit 101 performs display control to display a menu screen on the display 104, and selects one of the setting mode or the operation mode according to a user operation.

Figure 3:
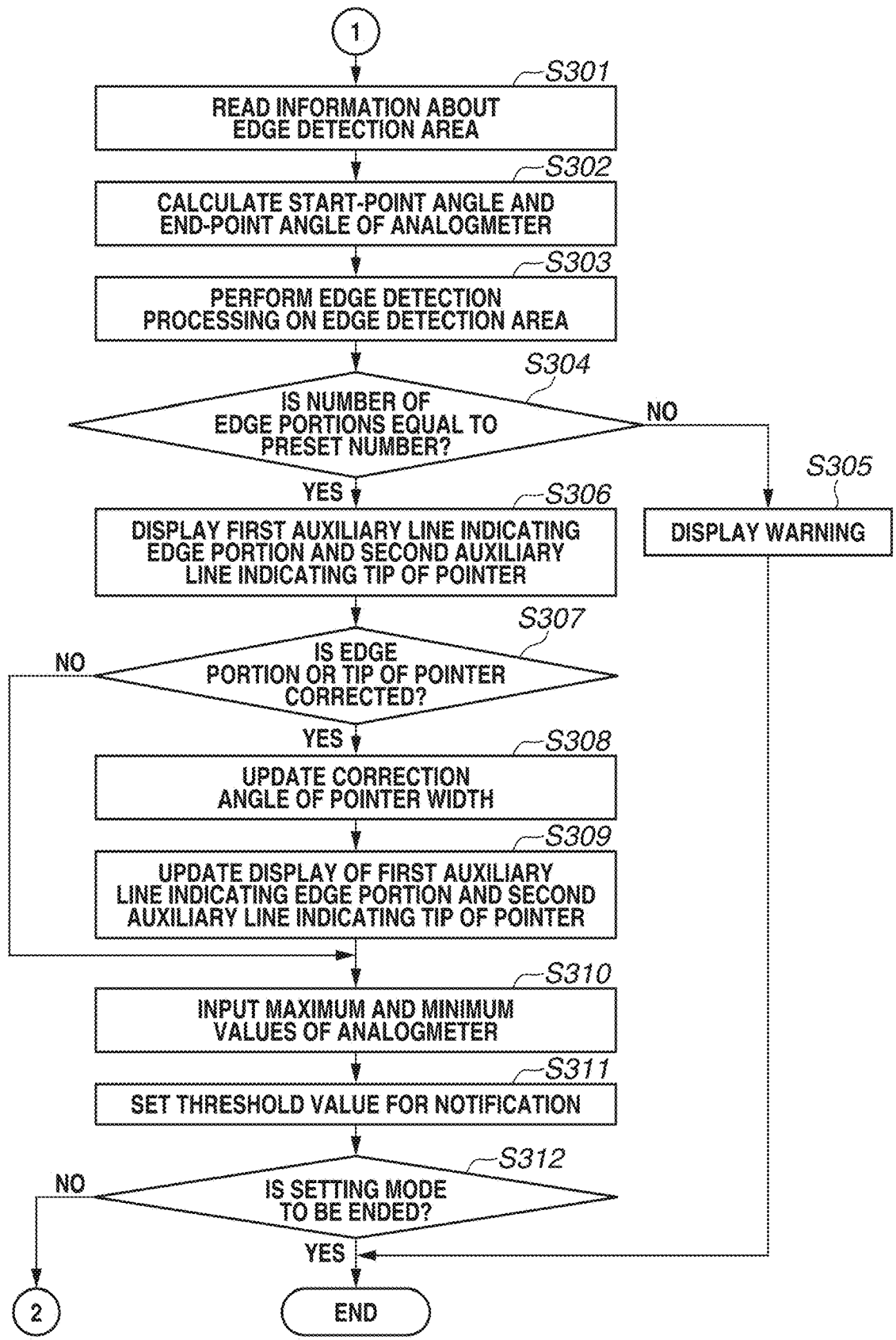
FIG. 3 is a flowchart illustrating an example of operations of the image processing apparatus in the setting mode according to an exemplary embodiment of the disclosure.

The operations of the image processing apparatus 100 in the case where the setting mode is selected will be described below with reference to the flowcharts illustrated in FIGS. 2 and 3.

Figure 4:
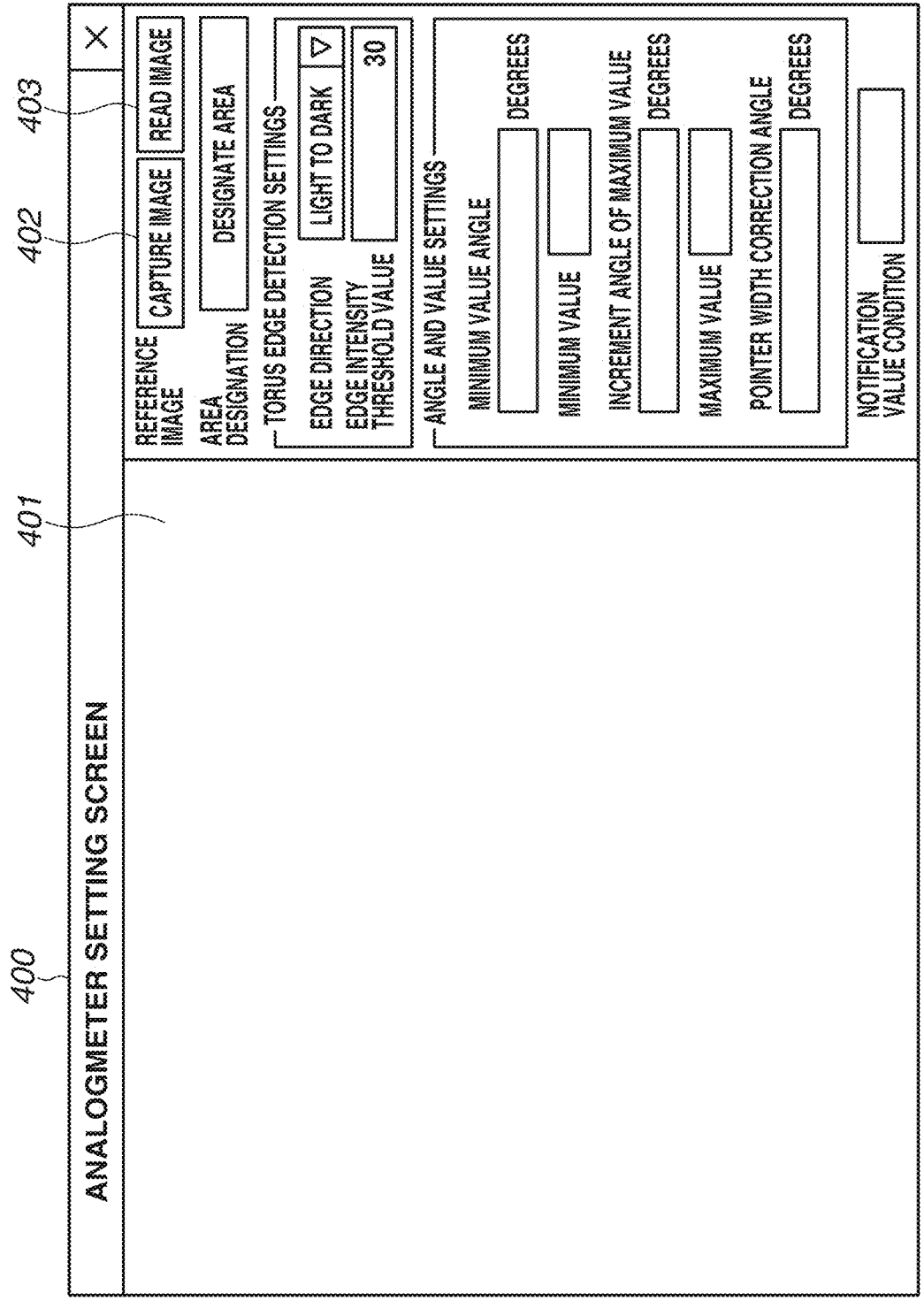
FIG. 4 illustrates an example of an analogmeter setting screen according to an exemplary embodiment of the disclosure.

In step S201, the control unit 101 determine whether an instruction to acquire a captured image of the analogmeter 114 is input. If the setting mode is selected on the menu screen described above, the control unit 101 displays an analogmeter setting screen 400 as illustrated in FIG. 4 on the display 104. A capture image button 402 is an area for instructing the imaging apparatus 112 to capture an image, storing a captured image in the HDD 105, and receiving an instruction to read the captured image from the HDD 105. A read image button 403 is an area for receiving an instruction to read an image already stored in the HDD 105. If the control unit 101 detects a user operation on the capture image button 402 or the read image button 403, the control unit 101 determines that an instruction from the user to acquire an image is input. If the control unit 101 receives a user operation on the capture image button 402 (YES in step S201), the control unit 101 transmits an image capturing instruction to the imaging apparatus 112 via the network interface 108. If the imaging apparatus 112 receives the image capturing instruction from the image processing apparatus 100, the imaging apparatus 112 performs image capturing processing on the analogmeter 114 as an object to generate image data, and transmits the generated image data to the image processing apparatus 100. In step S202, the image processing apparatus 100 acquires the image data from the imaging apparatus 112 via the network interface 108, stores the image data in the HDD 105, and reads the image data from the HDD 105 and writes the image data into the RAM 103. On the other hand, if the control unit 101 receives a user operation on the read image button 403 (YES in step S201), the control unit 101 displays a file-open dialog. Then, in step S202, the control unit 101 reads the image data from the HDD 105 selected by the user on the file-open dialog and writes the image data into the RAM 103.

Figure 5:
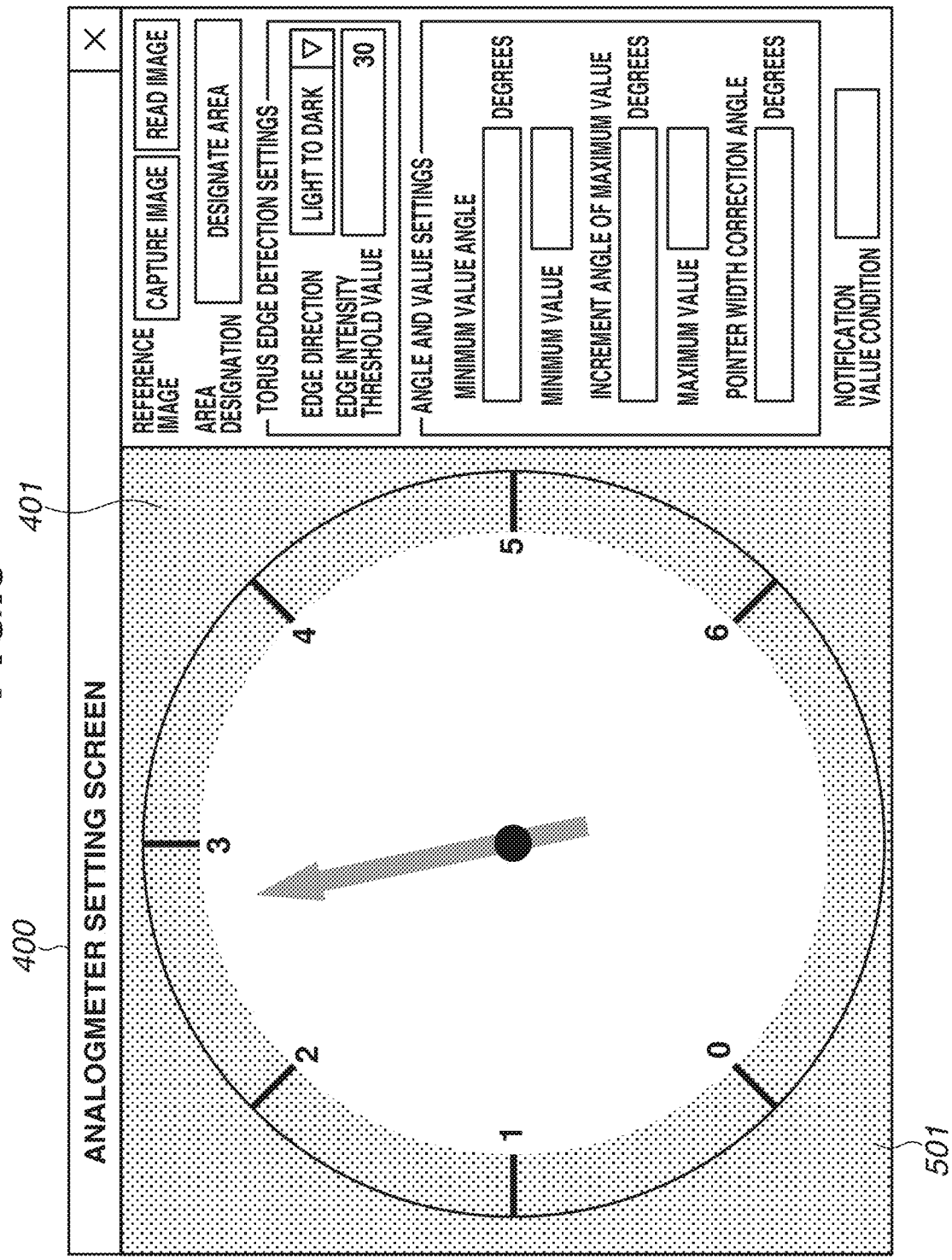
FIG. 5 illustrates an example of the analogmeter setting screen according to an exemplary embodiment of the disclosure.

In step S203, the control unit 101 displays image data 501 read from the HDD 105 to the RAM 103 in an image display area 401, as illustrated in FIG. 5.

Figure 6:
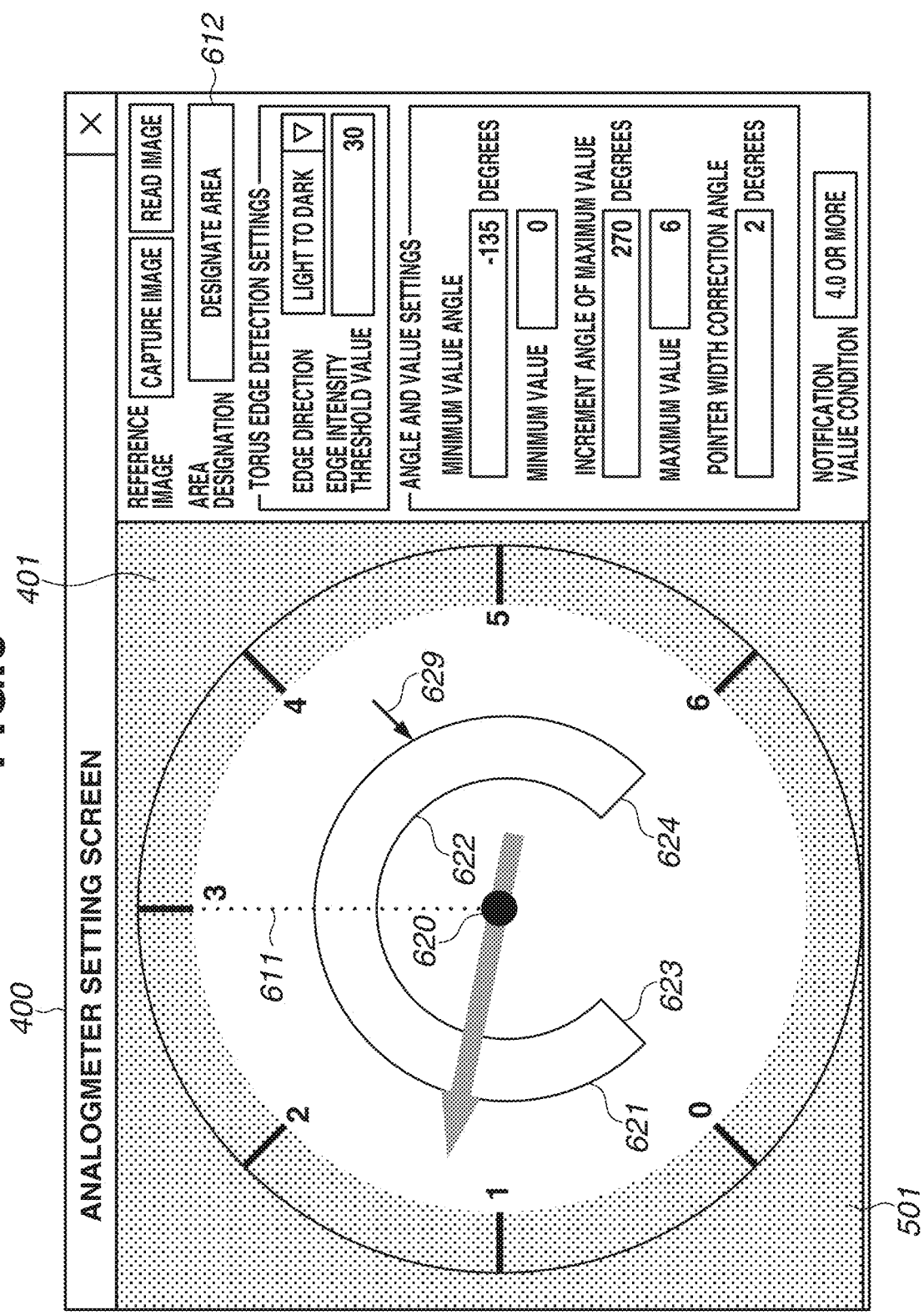
FIG. 6 illustrates an example of the analogmeter setting screen according to an exemplary embodiment of the disclosure.

In step S204, if the control unit 101 receives a press operation on a designate area button 612 for designating an edge detection area, the control unit 101 draws and displays a geometric shape for edge detection area designation, and determines whether a user operation to designate a central point of the edge detection area is received. For example, if a left-click operation of the pointing device (the input device 106) is performed on the image data 501 displayed in the image display area 401 (YES in step S204), then in step S205, the control unit 101 stores the coordinates of the position as the coordinates of the central point of the edge detection area in the RAM 103. FIG. 6 illustrates a central point 620. On the image data 501, the origin of the coordinates is located at the upper left, and the X-coordinate increases rightward whereas the Y-coordinate increases downward.

In step S206, the control unit 101 draws an outer-circle arc 621 on the image data 501 such that the center of the outer-circle arc 621 is located at the central point 620 and the distance from the central point 620 to the position at which a cursor 629 is located is the radius of the outer-circle arc 621, as illustrated in FIG. 6. As the user operates the pointing device to move the cursor 629 on the outer-circle arc 621 so that the distance from the central point 620 to the cursor 629 is changed, the radius of the outer-circle arc 621 is changed, and the control unit 101 re-draws the outer-circle arc 621. In step S207, the control unit 101 determines whether a user operation to designate the radius of the outer circle is received. For example, if a left-click operation is performed while the cursor 629 is on the outer-circle arc 621 (YES in step S207), then in step S208, the control unit 101 stores the distance from the position of the cursor 629 to the central point 620 as the radius of the outer circle in the RAM 103. Then, in step S209, the control unit 101 draws at least a portion of a torus (partial torus) on the image data 501 displayed in the image display area 401, based on the central point 620 and the radius of the outer circle. An initial value of the radius of the inner circle of the torus is less than the radius of the outer circle by a predetermined value (e.g., 20 pixels). Further, start-point and end-point angles of the partial torus are also drawn using predetermined initial values. In the present exemplary embodiment, a central line 611 is a line that passes through the central point 620 in the vertical direction in the image display area 401, and the clockwise direction from the central line 611 is positive angles whereas the anti-clockwise direction from the central line 611 is negative angles. For example, the initial value of the start-point angle is −140 degrees from the central line 611, and the initial value of the end-point angle is an increment angle of +280 degrees from the start-point angle. Thus, the partial torus is drawn using these initial values. As the user operates the pointing device to move the cursor 629 on an inner-circle arc 622, the radius of the inner circle is changed (YES in step S210). In step S211, the control unit 101 stores the value of distance from the end position of the movement of the cursor 629 to the central point 620 as the radius of the inner circle in the RAM 103, and in step S212, the control unit 101 redraws and displays the inner-circle arc 622. In step S212, if the cursor 629 on the outer-circle arc 621 is moved, the radius of the outer circle is changed, and a value that is less than the radius of the outer circle by a predetermined value (e.g., 1 pixel) is stored as the radius of the inner circle in the RAM 103.

As the user operates the pointing device to move the cursor 629 on a start side 623 of the partial torus, the start-point angle is changed (YES in step S213). Thus, in step S214, the control unit 101 stores the angle between the line segment connecting the end position of the movement of the cursor 629 and the central point 620 and the central line 611 as the start-point angle in the RAM 103, and in step S215, the control unit 101 moves the start side 623 to redraw and display the partial torus. If the end position of the movement of the cursor 629 to change the start-point angle is a position beyond an end side 624, an angle obtained by adding −220 degrees to the central line 611 is stored in the RAM 103 as the start-point angle. Further, the control unit 101 may control such that the movement of the cursor 629 to change the start-point angle is allowed to be only within a position not beyond the end side 624, and is not allowed to go beyond the end side 624.

As the user operates the pointing device to move the cursor 629 on the end side 624 of the partial torus, the end-point angle is changed (YES in step S216). Thus, in step S217, the control unit 101 stores the angle between the start side 623 of the partial torus and the line segment connecting end position of the movement of the cursor 629 and the central point 620 as an increment angle (end-point angle) from the start-point angle in the RAM 103. Then, in step S218, the control unit 101 moves the end side 624 to redraw and display the partial torus. If the end position of the movement of the cursor 629 to change the end-point angle is a position beyond the start side 623, an angle obtained by adding +360 degrees to the start-point angle is stored as the end-point angle in the RAM 103. Further, the control unit 101 may perform control in such a manner that the movement of the cursor 629 to change the end-point angle is only allowed to be up to the start side 623, and is not allowed to go beyond the start side 623.

In step S301, in response to the user operation, the control unit 101 reads, from the RAM 103, the coordinates of the central point 620 of the torus, the start-point and end-point angles of the torus as information about an edge detection area 700, and in step S302, the control unit 101 calculates the start-point and end-point angles of the analogmeter 114. The start-point angle of the analogmeter 114 is a value obtained by adding a predetermined value (e.g., 2 degrees) to the start-point angle of the edge detection area 700, and the end-point angle of the analogmeter 114 is a value obtained by subtracting a predetermined value (e.g., 4 degrees) from the end-point angle of the edge detection area 700, and the values are calculated such that the start-point and end-point angles are located within the edge detection area 700. The calculated values are displayed as the initial values in the sections of a minimum value angle 701 and a maximum value angle 702, respectively, in FIG. 7. Further, a line segment 711 which forms the minimum value angle 701 from the central line 611, and a line segment 712 which forms the maximum value angle 702 from the central line 611 are displayed on the image data 501. The user operates the input device 106 to input a value to the minimum value angle 701 and the maximum value angle 702 or move the line segments 711 or 712, whereby the start-point and end-point angles of the analogmeter 114 are changed, and the values stored in the RAM 103 are updated.

Then, in step S303, the control unit 101 performs edge detection processing in the edge detection area 700 according to the values input to an edge direction 703 and an edge intensity threshold value 704, and stores the coordinates specifying an edge portion in the RAM 103. In the present exemplary embodiment, Laplacian filter processing is applied to the image data 501 converted into gray-scale data, and an edge portion search is performed from the start side 623 toward the end side 624 of the edge detection area 700 in the image having undergone the Laplacian filter processing.

In the present exemplary embodiment, one of "light to dark", "dark to light", and "both light to dark and dark to light" is set to the edge direction 703. The edge intensity threshold value 704 is a threshold value for the difference between adjacent pixel values to be detected as an edge portion. The greater the difference between the adjacent pixel values, the greater the difference in gradation and the higher the edge intensity. For example, if 30 is designated as the edge intensity threshold value 704 by a user operation, the control unit 101 detects a portion where the difference between the pixel values of adjacent pixels is 30 or more, as an edge portion candidate. If "light to dark" is set to the edge direction 703, the control unit 101 compares the values of adjacent pixels of the detected edge portion candidate and determines a portion where the pixel values change from high to low values as an edge portion. In the case in which "dark to light" is set to the edge direction 703, the control unit 101 compares the values of adjacent pixels of the detected edge portion candidate and determines a portion where the pixel values change from low to high values as an edge portion. In the case in which "both light to dark and dark to light" is set to the edge direction 703, the control unit 101 determines the edge portion candidate as an edge portion regardless of the direction of changes in the pixel values.

In step S304, the control unit 101 determines whether the number of determined edge portions is equal to a preset number. In the present exemplary embodiment, for example, 2 is preset as the number of the ends of a pointer 730. In the cases in which the pointer 730 includes a decoration line or the like, a number that is more than two is preset. Further, in the case in which pixels of an edge portion are adjacent to each other, the edge portion is counted as one edge composed of continuous pixels.

If the number of determined edge portions is not equal to the present number (NO in step S304), then in step S305, a warning dialog indicating that an edge other than the pointer 730 is detected, is displayed. For example, an edge portion of an unnecessary object other than the pointer 730 may be erroneously detected due to the presence of a foreign matter such as dirt and dust attached to the analogmeter 114.

On the other hand, if the number of determined edge portions is equal to the present number (YES in step S304), then in step S306, the control unit 101 draws and displays a first auxiliary line 728 indicating the closest edge portion to the start side 623 on the image data 501. Next, the control unit 101 draws and displays a second auxiliary line 725 on the image data 501 as a line segment that passes through the tip of the pointer 730. The second auxiliary line 725 forms an angle of a pointer width correction angle 705 against the line that connects an intersection point 729 of the first auxiliary line 728 and the outer-circle arc 621 and the central point 620.

After the user checks the first auxiliary line 728 and the second auxiliary line 725 drawn on the image data 501, the user may operate the input device 106 to move the first auxiliary line 728 and/or the second auxiliary line 725. In this way, the user can correct the positions of the edge portion and the tip portion of the pointer 730, and change the value of the pointer width correction angle 705. Further, the value of the pointer width correction angle 705 can directly be corrected. If the control unit 101 detects an operation to correct the pointer width correction angle 705 (YES in step S307), then in step S308, the control unit 101 stores the value of the pointer width correction angle 705 in the RAM 103. In step S309, the control unit 101 redraws and displays the first auxiliary line 728 and/or the second auxiliary line 725.

In step S310, the control unit 101 inputs a minimum value 721 and a maximum value 722 of the analogmeter 114 in response to a user operation. Alternatively, the control unit 101 may execute text recognition processing on the image data 501 and automatically acquire and input the minimum value 721 and the maximum value 722.

In step S311, the control unit 101 sets a measurement value condition (notification value condition 723) for notification in response to a user operation. In the case of operating in the operation mode, the control unit 101 performs notification if the pointer 730 of the analogmeter 114 specifies a value outside or within a predetermined value range.

Finally, if the control unit 101 receives a user operation on an end button 731 (YES in step S312), the control unit 101 ends the operations in the setting mode. Alternatively, the end of the operations in the setting mode may be followed by a start of the operations in the operation mode, and a screen (not illustrated) of the operation mode can be displayed on the display 104 in place of the analogmeter setting screen 400.

<Processing in Operation Mode>

Next, a process performed when the image processing apparatus 100 in the present exemplary embodiment operates in the operation mode will be described below with reference to the drawings.

The control unit 101 of the image processing apparatus 100 reads and starts the application program from the HDD 105 for executing analogmeter reading processing. The control unit 101 executes operations described below according to the OS and the application program.

When the application program is activated, the control unit 101 performs display control to display the menu screen on the display 104 and selects one of the setting mode and the operation mode according to a user operation.

Figure 8:
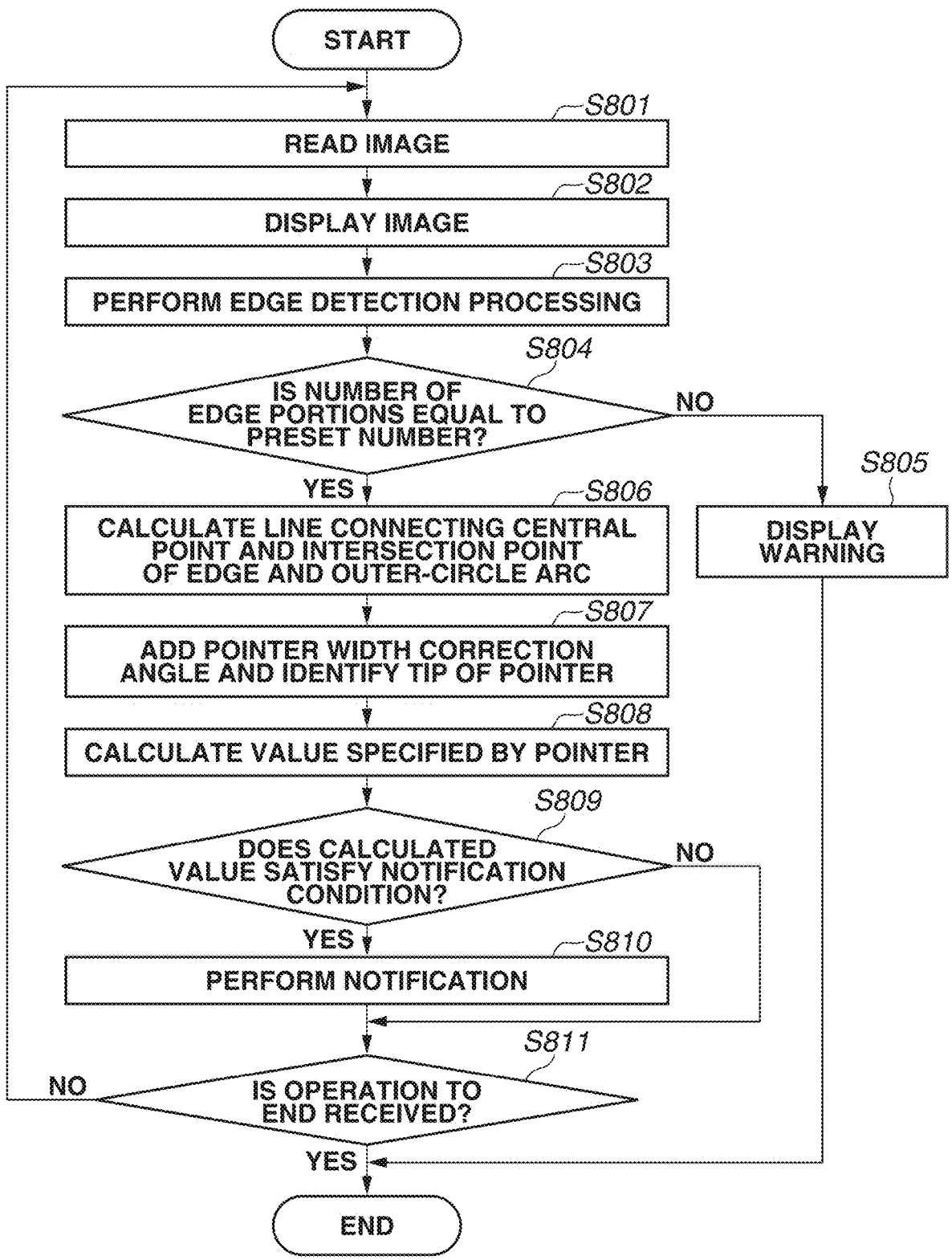
FIG. 8 is a flowchart illustrating an example of operations of an image processing apparatus in an operation mode according to an exemplary embodiment of the disclosure.

The operations of the image processing apparatus 100 in the case where the operation mode is selected will be described below with reference to the flowchart illustrated in FIG. 8.

In step S801, the image processing apparatus 100 is connected with the imaging apparatus 112 via the network interface 108, and the control unit 101 transmits an image capturing instruction to the imaging apparatus 112, and acquires an image captured by the image capturing from the imaging apparatus 112, and stores the image in the HDD 105. The imaging apparatus 112 captures the image of the analogmeter 114 at the same position as the position at which the image is acquired in step S202 in the setting mode. The imaging apparatus 112 may perform image capturing processing and periodically transmit the images to the image processing apparatus 100 or continuously distribute the images by streaming. Alternatively, the image processing apparatus 100 can periodically transmit an image capturing instruction, and the imaging apparatus 112 can periodically perform image capturing in response to the image capturing instruction and transmit an image to the image processing apparatus 100.

In step S802, the control unit 101 converts the image acquired from the imaging apparatus 112 into a gray-scale image and displays the gray-scale image on the screen. Alternatively, the imaging apparatus 112 may convert the image into a gray-scale image and the image processing apparatus 100 receives the converted image.

In step S803, the control unit 101 applies the Laplacian filter to the converted gray-scale image data and performs edge detection processing on the edge detection area 700 in the image to which the Laplacian filter is applied, as in step S303. In step S804, the control unit 101 determines whether the number of detected edge portions is equal to the preset number, as in step S304. If the number of detected edge portions is not equal to the preset number (NO in step S804), then in step S805, the warning dialog indicating that an edge other than the pointer 730 is detected, is displayed. On the other hand, if the number of detected edge portions is equal to the preset number (YES in step S804), then in step S806, the control unit 101 calculates a line that connects the intersection point of the closest edge to the start side of the edge detection area 700 and the outer-circle arc of the edge detection area 700 and the central point 620 of the analogmeter 114. In step S807, the control unit 101 identifies the tip of the pointer 730 on the line that forms an angle of the pointer width correction angle 705 with respect to the line calculated in step S806, and stores the corrected angle in the RAM 103.

In step S808, the control unit 101 calculates the value pointed by the pointer 730 and stores the calculated value in the HDD 105. The calculated value is stored in association with attribute information such as measurement time/date in the HDD 105.

Figure 9:
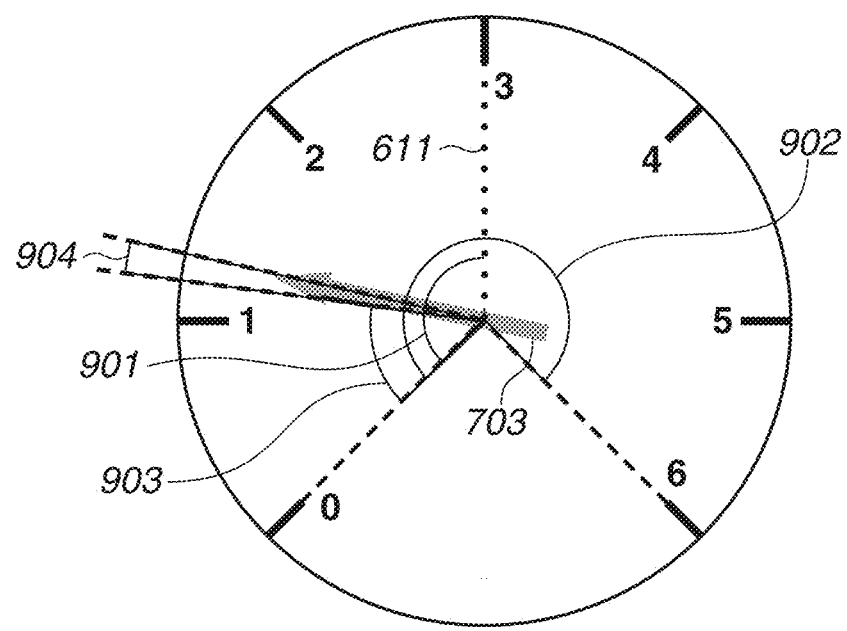
FIG. 9 is a conceptual diagram illustrating an analogmeter according to an exemplary embodiment of the disclosure.

The calculation processing in step S808 will be described below with reference to the conceptual diagram of the analogmeter 114 in FIG. 9. A minimum angle (degMin) 901 is an angle set to the minimum value angle 701 from the central line 611. A maximum angle (degInc) 902 is an angle obtained by adding the maximum value angle 702 to the minimum angle 901. A pointer angle (degEdge) 903 is an angle from the minimum angle 901 to the edge of the pointer 730. A pointer width correction angle value (degWN) 904 is an angle set to the pointer width correction angle 705.

A calculation formula for a value valNeedle indicated by the pointer 730 is expressed by formula (1) below $$valNeedle = (degWN + degEdge) \times (valMax - valMin) / degInc + valMin \qquad (1),$$

where valMin is the value set to the minimum value 721, and valMax is the value set to the maximum value 722.

When the pointer angle degEdge 903 is 43 degrees, the pointer width correction angle value degWN 904 is 2 degrees, the maximum angle degInc 902 is 270 degrees, the minimum value valMin is 0, and the maximum value valMax is 6, the value of valNeedle is 1.

When the pointer angle degEdge 903 is 205 degrees, the pointer width correction angle value degWN 904 is 5 degrees, the maximum angle degInc 902 is 270 degrees, the minimum value valMin is 0, and the maximum value valMax is 6, the value of valNeedle is 4.44 when the number of significant figures is to the second decimal place.

In step S809, the control unit 101 determines whether the value calculated in step S808 satisfies the notification value condition 723. If the control unit 101 determines that the value calculated in step S808 satisfies the notification value condition 723 (YES in step S809), then in step S810, the control unit 101 performs notification. For example, the control unit 101 displays the warning dialog on the display 104. Further, an instruction as to whether to continue the operation mode may be received according to an operation on the warning dialog. Further, the warning dialog may be displayed on the image data. The edge detection area 700, the edge detection position, an auxiliary line 725 that passes through the tip of the pointer 730, etc. may also be displayed on the image data.

Then, if the control unit 101 receives an operation to end the processing (YES in step S811), the control unit 101 ends the operations in the operation mode.

As described above, in the setting mode, the image processing apparatus 100 in the present exemplary embodiment acquires the image of the analogmeter 114 from the imaging apparatus 112 and presets the values of the scale and the pointer 730. Then, in the operation mode, the image processing apparatus 100 acquires the image of the analogmeter 114 from the imaging apparatus 112, detects the pointer 730 according to the preset values, and calculates the value indicated by the pointer 730. Then, the image processing apparatus 100 records the calculated value indicated by the pointer 730 in the HDD 105, and performs notification if the predetermined condition is satisfied.

In the present exemplary embodiment, in the operation mode, the control unit 101 issues the warning dialog if the number of edges detected in the edge detection area 700 is not equal to the predetermined value in step S805. For further improvement of the reliability, edges may be detected from both the start-point and end-point directions, and the control unit 101 determine whether the angle formed by the lines connecting the respective edges and the central point 620 is approximately twice the pointer width correction angle 705. A warning of erroneous detection may be issued if the angle is not approximately twice the pointer width correction angle 705.

In the present exemplary embodiment, in the operation mode, the control unit 101 displays the warning dialog to stop measurement if the number of edges detected in the edge detection area is not equal to the predetermined value. The control unit 101 may issue a notification that the reliability of the calculated value is low, and continue the measurement.

Figure 7:
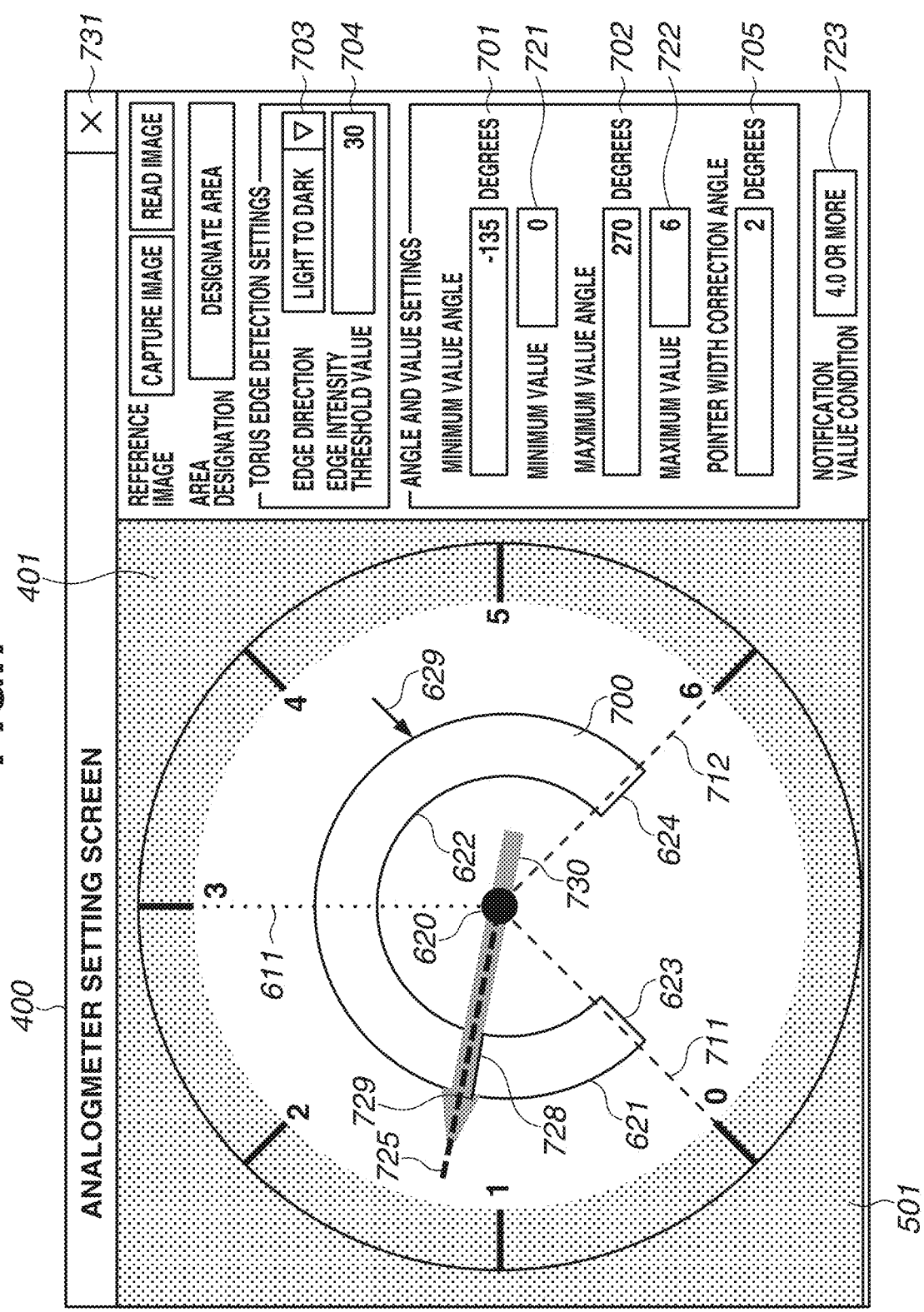
FIG. 7 illustrates an example of the analogmeter setting screen according to an exemplary embodiment of the disclosure.
Figure 15:
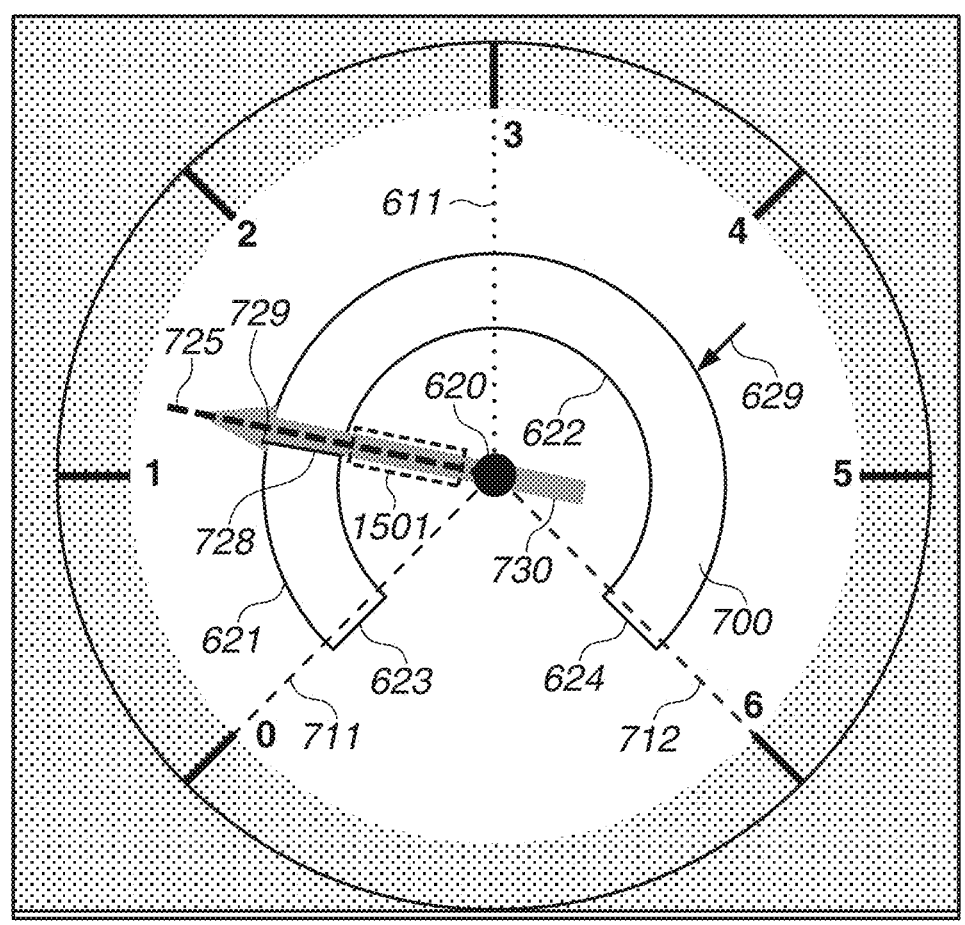
FIG. 15 is a conceptual diagram illustrating an analogmeter according to an exemplary embodiment of the disclosure.

Further, in the operation mode, the control unit 101 may set a new edge detection area on the central line based on the edges detected in the edge detection area 700 to improve the accuracy of edge detection. FIG. 15 is a diagram illustrating the concept of setting a new edge detection area on the central line on the analogmeter setting screen. The edge detection area 700 in FIG. 15 is the same as illustrated in FIG. 7. In the cases where an edge (728 in FIG. 7) is detected in the edge detection area 700 surrounded by curves 621 and 622 and straight lines 623 and 624, a new pointer width area is set as an edge detection area 1501 on the straight line connecting the edge (728 in FIG. 7) and the central point 620, and the edge detection is determined as being completed if an edge is detected in the edge detection area 1501, whereby erroneous detection is avoided.

The processing of adding the edge detection area 1501 and executing edge detection is performed in step S303. Further, the processing can be performed in step S803 in combination with the method of avoiding erroneous edge detection using the pointer width correction angle.

In the present exemplary embodiment, the radius of the outer circle of the edge detection area 700 may be increased within the range where the number of values detected in the edge detection area 700 is equal to the predetermined value in the setting mode. The larger the radius of the outer circle of the edge detection area 700 becomes, the more precisely the changes in the angle of the pointer 730 are detected.

While the Laplacian filter is used in the edge detection processing in the present exemplary embodiment, any other filter capable of detecting high-frequency components can be used. In the case where the filter size is large, the positions of the start side 623 and the end side 624 of the edge detection area 700 are extended with the pointer width correction angle taken into consideration so that detection is executable even if the pointer 730 is located on the start side 623 or the end side 624 of the edge detection area 700.

In the case where the minimum value angle 701 or the maximum value angle 702 is located outside the edge detection area 700, the start side 623 and the end side 624 of the edge detection area 700 are changed to include the angle in the edge detection area 700.

As described above, the user can adjust the edge detection area 700 while checking the image of the analogmeter 114 that is captured by the imaging apparatus 112, this reduces detection of an unnecessary edge outside the edge detection area 700 and thus reduces the possibility of erroneous detection of the value of the pointer 730.

In the present exemplary embodiment, the width from the edge to the tip of the pointer 730 is adjustable using the pointer width correction angle 705. This enables accurate calculation of the value indicated by the pointer 730 regardless of the shape of the pointer 730 even in the case where the shape of the pointer 730 is thick or thin.

In the present exemplary embodiment, the user can make an adjustment by a simple operation while checking the displayed edge detection area 700 in the setting mode. Further, the settings may be changed during the operation mode.

In the present exemplary embodiment, the number of edges detected in the edge detection area 700 is compared with the predetermined value, and the warning dialog is issued if the number of edges detected in the edge detection area 700 is different from the predetermined value. Thus, the user receives a notification of the possibility of erroneous detection due to the presence of a foreign matter in the edge detection area 700.

In the present exemplary embodiment, the auxiliary lines are superimposed on the measurement target image based on setting information such as the edge detection area 700 and the edge detection position in the operation mode in the case where the measurement value satisfies the predetermined condition or the reliability of the measurement value is low. This enables the user to check the situation with ease.

In a second present exemplary embodiment, an image processing apparatus will be described below that reads a measurement value according to a pointer specifying a physical quantity such as a temperature, a pressure, the number of rotations, a current, or a voltage in a stick-shaped analogmeter (rectangular measuring instrument) in place of the circular analogmeter. Description of the configurations that are similar to those in the exemplary embodiment described above is omitted.

<Processing in Setting Mode>

Figure 11:
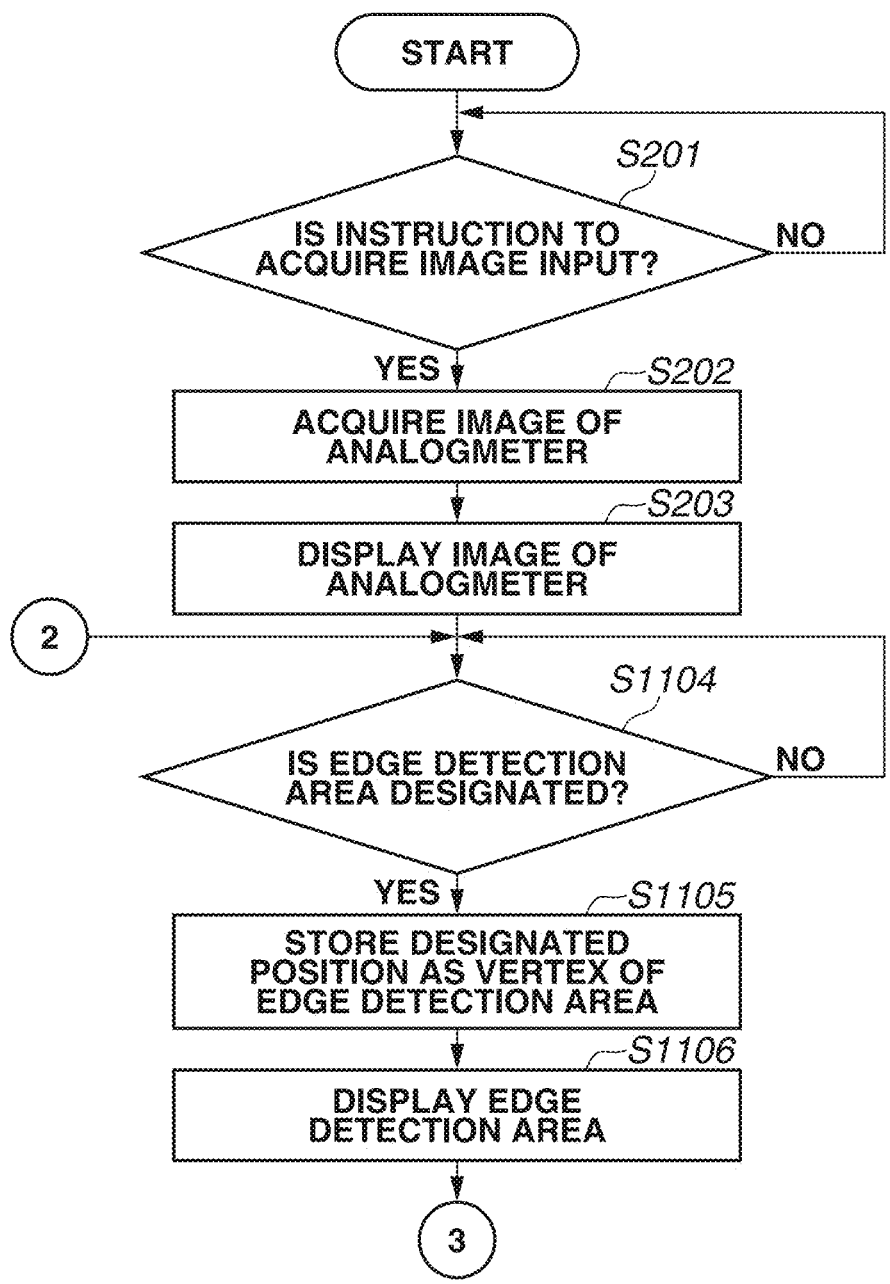
FIG. 11 is a flowchart illustrating an example of operations of an image processing apparatus in the setting mode according to an exemplary embodiment of the disclosure.
Figure 12:
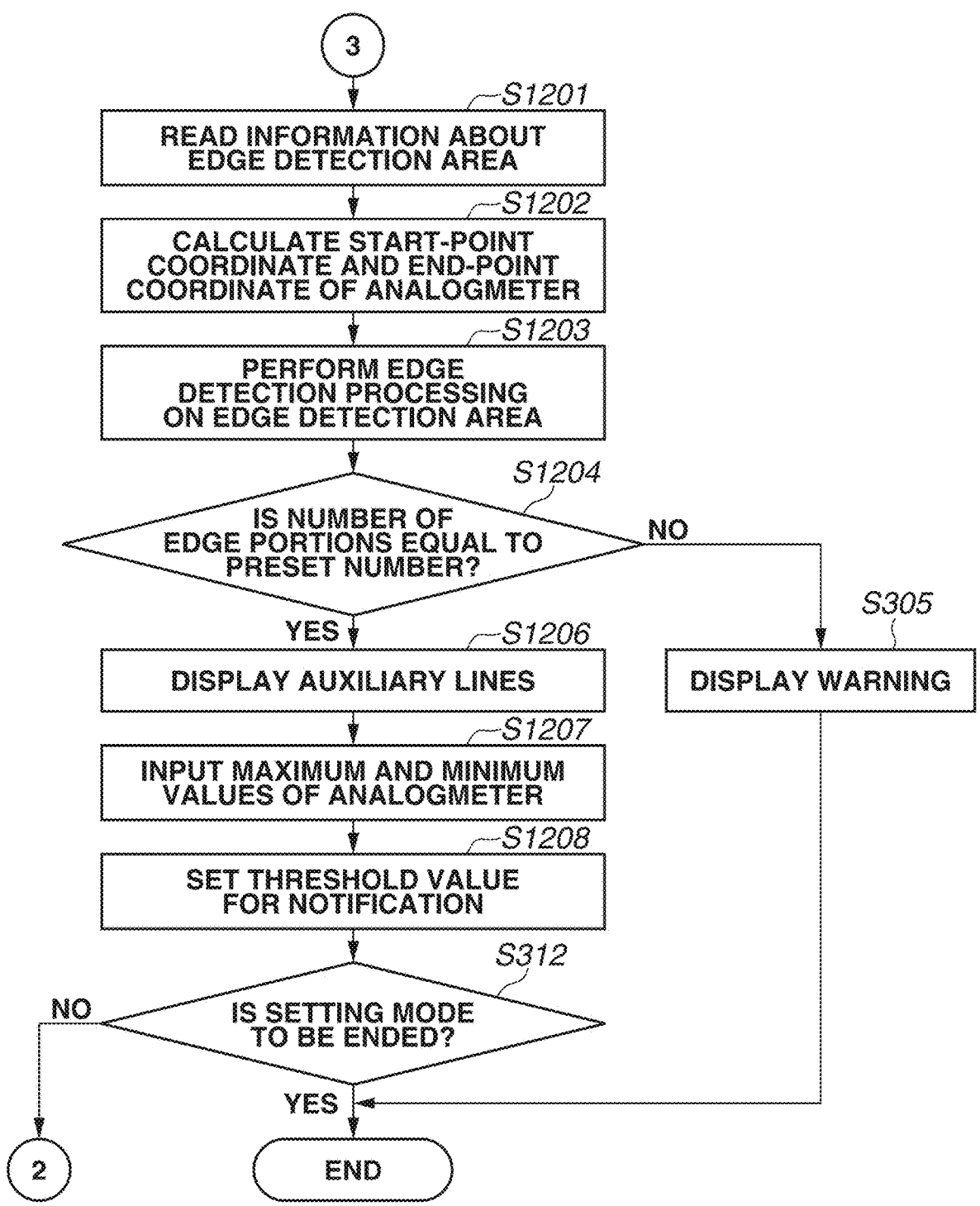
FIG. 12 is a flowchart illustrating an example of operations of an image processing apparatus in the setting mode according to an exemplary embodiment of the disclosure.
Figure 13:
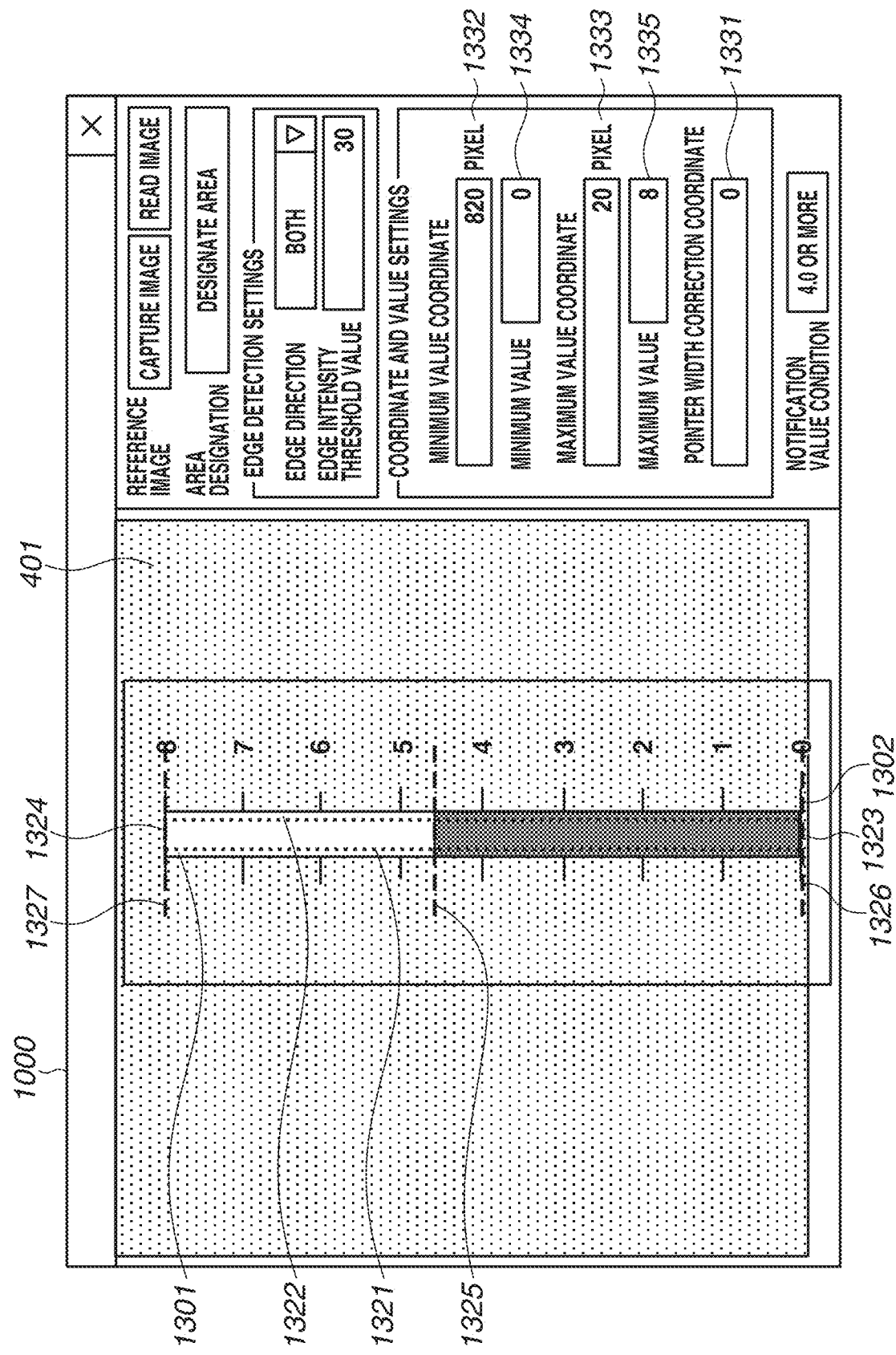
FIG. 13 illustrates an example of the analogmeter setting screen according to an exemplary embodiment of the disclosure.

First, a process performed when the image processing apparatus 100 in the second present exemplary embodiment operates in the setting mode will be described below with reference to FIGS. 11, 12, and 13.

Figure 10:
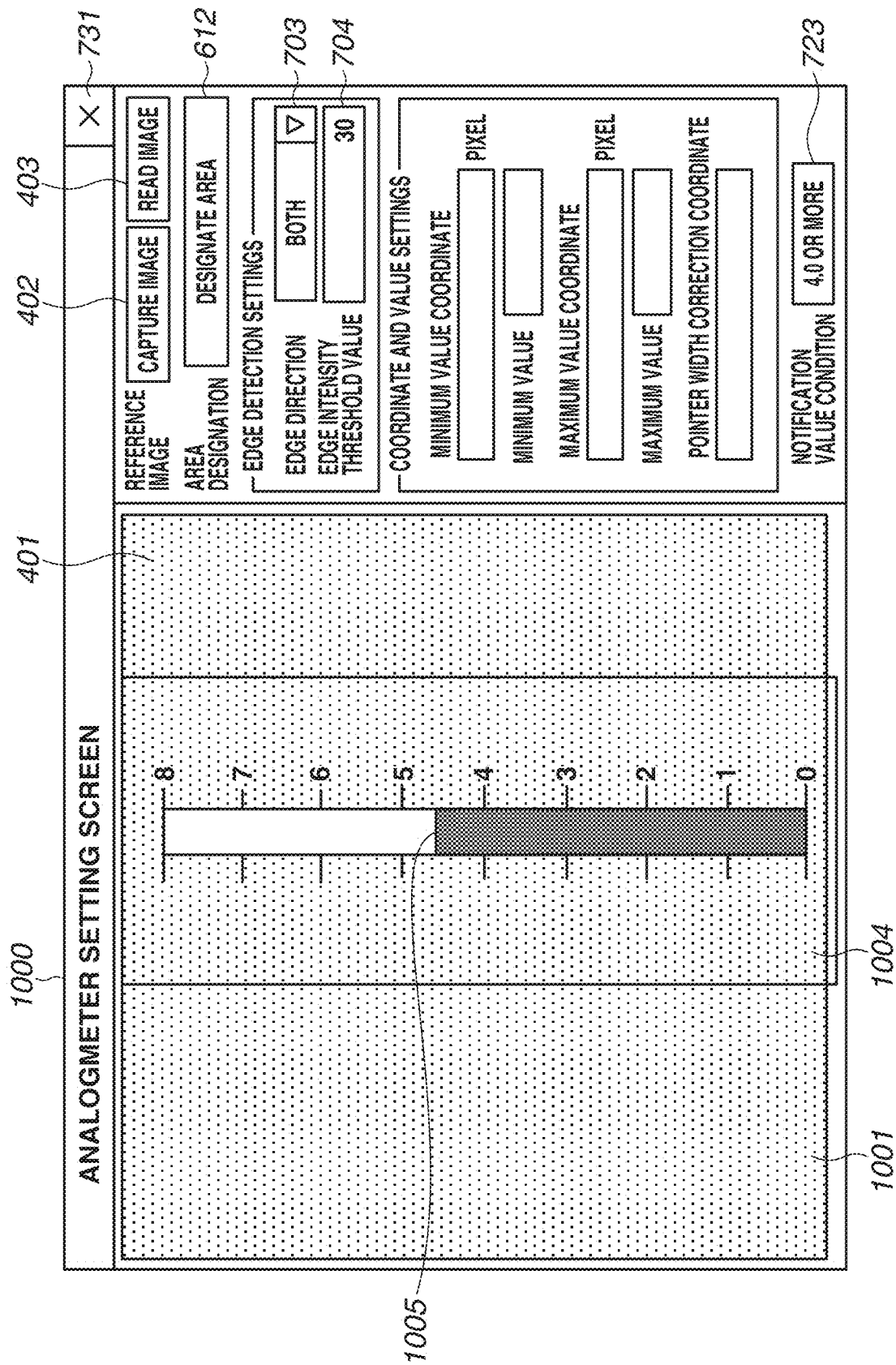
FIG. 10 illustrates an example of the analogmeter setting screen according to an exemplary embodiment of the disclosure.

The control unit 101 of the image processing apparatus 100 reads an application program for executing analogmeter reading processing from the HDD 105 and starts the application program. The control unit 101 executes operations described below according to the OS and the application program. Then, the control unit 101 executes similar processing to steps S201 to S203 in FIG. 2, and displays an analogmeter setting screen 1000 on the display 104 as illustrated in FIG. 10.

If a drug start operation and an end operation of the pointing device (the input device 106) are performed on the image data 1001 displayed in the image display area 401 (YES in step S1104), in step S1105, the control unit 101 stores the coordinates of the respective positions (1301, 1302) as the opposite vertexes of a rectangular area in the RAM 103. Then, in step S1106, the control unit 101 draws a rectangular area and displays the drawn rectangular area as an edge detection area 1004.

In step S1201, the control unit 101 reads the coordinates of the vertexes as information about the edge detection area 1004 from the RAM 103 in response to a user operation. In step S1202, a value obtained by subtracting a predetermined value from the Y-coordinate of the start point 1301 of the edge detection area 1004, and a value obtained by adding a predetermined value to the Y-coordinate of the end point 1302 are respectively calculated as the start-point and end-point coordinates of the analogmeter 114. Specifically, the edge detection area 1004 is adjusted and set to include the start and end points of the analogmeter 114. The predetermined values are, for example, 2 pixels. Further, the predetermined values can be different. In the second present exemplary embodiment, the coordinates are specified by values with the origin set to the upper left of the image data 1001 displayed in the image display area 401.

In step S1203, the control unit 101 performs edge detection processing on the edge detection area 1004 according to the values respectively input to the edge direction 703 and the edge intensity threshold value 704, and stores the coordinates specifying the edge portion in the RAM 103, as in step S303. In step S1204, the control unit 101 determines whether the number of determined edge portions is equal to the preset number, as in step S304. In the second present exemplary embodiment, the predetermined value is set to 1. While the predetermined value is set to 1 in the second present exemplary embodiment, the user can designate any value as the predetermined value. This enables measurement even in the case where the pointer is composed of a plurality of lines.

If the number of determined edge portion is equal to the preset number (YES in step S1204), the Y coordinate of the position of the horizontal line via the determined edge point is calculated as an initial value of the coordinates of a pointer 1005, then in step S1206, the control unit 101 displays the auxiliary lines on the image data 1001. Specifically, an auxiliary line 1321 is displayed which indicates a rectangle having the start point 1301 and the end point 1302 as the opposite vertexes as the edge detection area 1004. Further, an auxiliary line 1323 indicating the start point of the edge detection area 1004 and an auxiliary line 1324 indicating the end point of the edge detection area 1004, both of which auxiliary lines are acquired in step S1201, and an auxiliary line 1326 indicating the start point of the analogmeter 114 and an auxiliary line 1327 indicating the end point of the analogmeter 114 are displayed. Also, the auxiliary line 1325 indicating the position of the pointer 1005 calculated in step S1205 is drawn. In the case where a pointer width correction coordinate 1331 is set, the coordinates of the position of the pointer 1005 are corrected to reflect the value of the pointer width correction coordinate, the corrected coordinates are stored in the RAM 103, and the auxiliary line 1325 is moved and displayed.

Further, in step S1207, the control unit 101 sets and displays the values respectively corresponding to the coordinates of the start and end points of the analogmeter 114 with respect to a minimum value coordinate 1332 and a maximum value coordinate 1333.

In step S1208, the control unit 101 sets the notification value condition 723 for notification in response to a user operation. In the case of operating in the operation mode, the control unit 101 performs notification if the pointer 1005 of the analogmeter 114 specifies a value outside a predetermined value range or within a predetermined value range.

If the control unit 101 receives a user operation on the end button 731 (YES in step S312), the control unit 101 ends the operations in the setting mode. Alternatively, the end of the operations in the setting mode may be followed by a start of the operation mode, and a screen (not illustrated) of the operation mode may be displayed on the display 104 in place of the analogmeter setting screen 1000.

<Processing in Operation Mode>

Next, a process performed when the image processing apparatus 100 in the second present exemplary embodiment operates in the operation mode will be described below with reference to the drawings. The control unit 101 of the image processing apparatus 100 loads the application program for executing analogmeter reading processing from the HDD 105 and starts the application program. The control unit 101 executes operations described below according to the OS and the application program. Description of operations and configurations that are similar to those in the first exemplary embodiment is omitted.

Figure 14:
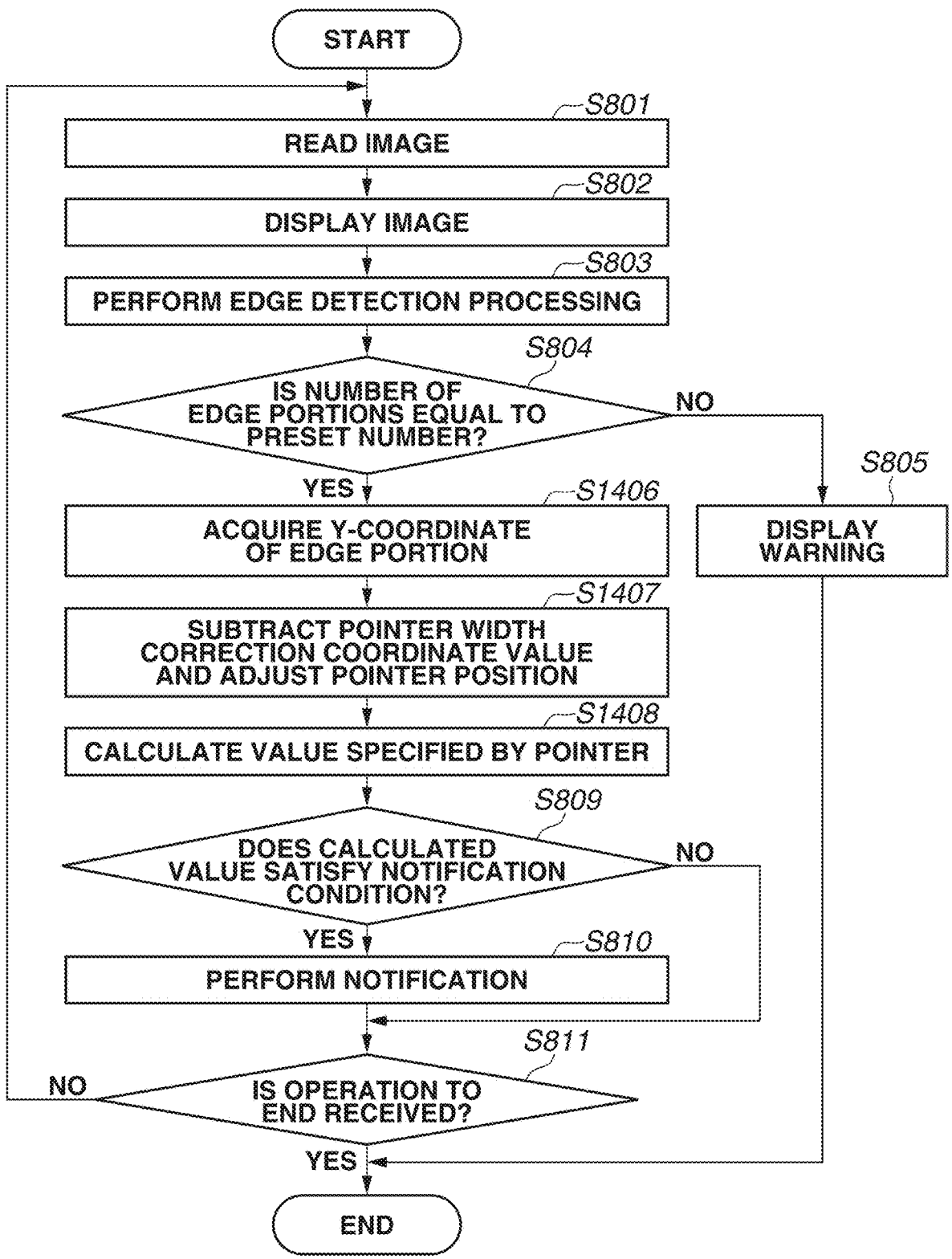
FIG. 14 is a flowchart illustrating an example of operations of an image processing apparatus in the operation mode according to an exemplary embodiment of the disclosure.

The operations of the image processing apparatus 100 in the second present exemplary embodiment in the case where the operation mode is selected will be described below with reference to the flowchart in FIG. 14. The control unit 101 executes similar processing to steps S801 to S805 in FIG. 8. In the second present exemplary embodiment, 1 is preset as the number of edges that is compared in step S804. Then, in step S1406, the control unit 101 acquires the Y-coordinate of the edge portion detected in step S803 as the coordinate of the pointer 1005, and in step S1407, the value set to the pointer width correction coordinate 1331 is subtracted, and the pointer coordinates are updated and stored in the RAM 103.

In step S1408, the control unit 101 calculates the value indicated by the pointer 1005 and stores the calculated value in the HDD 105. The calculated value is stored in association with attribute information such as measurement time/date in the HDD 105. The following describes the calculation processing in step S1408. A calculation formula for a value valNeedle indicated by the pointer 1005 is expressed by formula (2) below $$\text{valNeedle}=((y\text{Edge}-yWN)-y\text{Min})\times(\text{valMax}-\text{valMin})/(y\text{Max}-y\text{Min})+\text{valMin} \quad (2),$$

where yMin is the minimum value coordinate 1332, yMax is the maximum value coordinate 1333, yEdge is the coordinate of the pointer 1005, yWN is the pointer width correction coordinate, valMin is a minimum value 1334, and valMax is a maximum value 1335.

For example, when the coordinate yEdge of the pointer 1005 is 350, the pointer width correction coordinate degWN is 0, the minimum value coordinate yMin is 820, the maximum value coordinate yMax is 20, the minimum value valMin is 0, and the maximum value valMax is 8, valNeedle is 4.7. When the coordinate yEdge of the pointer 1005 is 642, the pointer width correction coordinate degWN is 2, the minimum value coordinate yMin is 1240, the maximum value coordinate yMax is 40, the minimum value valMin is 0, and the maximum value valMax is 12, valNeedle is 6.

Then, the control unit 101 executes similar processing to steps S809 to S811.

As described above, the image processing apparatus in the present exemplary embodiments enable the user to read the value indicated by the pointer with a simple setting even in the case where the measurement target analogmeter is in the shape of a stick.

The present exemplary embodiments make it possible to obtain a value indicated by a pointer regardless of the shape of the pointer of the analogmeter.

Other Embodiments

Embodiments of the disclosure can also be implemented by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-201268, filed Oct. 25, 2018, and No. 2017-221612, filed Nov. 17, 2017, which are hereby incorporated by reference herein in their entirety.

What is claimed is:

1. An apparatus comprising:
   an acquisition unit configured to acquire an image of a measuring instrument that is captured by an imaging apparatus;
   a first setting unit configured to set an area in the image as an edge detection processing target in response to a user operation;
   a detection unit configured to execute edge detection processing on the set area in the image;
   a second setting unit configured to set a value for correcting a position of a detected edge portion;
   a correction unit configured to correct the position of the detected edge portion based on the value; and
   a calculation unit configured to calculate a value indicated by a pointer of the measuring instrument according to the corrected position of the detected edge portion.

2. The apparatus according to claim 1, wherein the area is at least a portion of a torus, and the setting unit sets at least one of a center of the torus, a start side of the torus, an end side of the torus, a radius of an outer circle of the torus, and a radius of an inner circle of the torus.

3. The apparatus according to claim 2, wherein the position of the edge portion is indicated by an angle, and the calculation unit calculates the value indicated by the pointer of the measuring instrument based on an angle of a minimum value that the measuring instrument indicates, an angle of a maximum value that the measuring instrument indicates, and the angle of the edge portion.

4. The apparatus according to claim 1, wherein the area is a rectangle, and the setting unit sets opposite vertexes of the rectangle.

5. The apparatus according to claim 4, wherein the position of the edge portion is specified by a Y-coordinate, and the calculation unit calculates the value indicated by the pointer of the measuring instrument based on a Y-coordinate of a minimum value that the measuring instrument indicates, a Y-coordinate of a maximum value that the measuring instrument indicates, and the Y-coordinate of the edge portion.

6. The apparatus according to claim 1, further comprising:
   a third setting unit configured to preset a number of edge portions to be detected; and a notification unit configured to issue notification if a number of detected edge portions is not equal to the preset number.

7. The apparatus according to claim 6, further comprising a changing unit configured to change the area within a range where the number of detected edge portions is equal to the preset number.

8. A method of controlling an apparatus comprising:
acquiring an image of a measuring instrument that is captured by an imaging apparatus;
setting an area in the image as an edge detection processing target in response to a user operation;
executing edge detection processing on the set area in the image;
setting a value for correcting a position of a detected edge portion;
correcting the position of the detected edge portion based on the value; and
calculating a value indicated by a pointer of the measuring instrument according to the corrected position of the edge portion.

9. The method according to claim 8, wherein the area is at least a portion of a torus, and the setting sets at least one of a center of the torus, a start side of the torus, an end side of the torus, a radius of an outer circle of the torus, and a radius of an inner circle of the torus.

10. The method according to claim 9, wherein the position of the edge portion is indicated by an angle, and the calculating calculates the value indicated by the pointer of the measuring instrument based on an angle of a minimum value that the measuring instrument indicates, an angle of a maximum value that the measuring instrument indicates, and the angle of the edge portion.

11. The method according to claim 8, wherein the area is a rectangle, and the setting sets opposite vertexes of the rectangle.

12. The method according to claim 11, wherein the position of the edge portion is specified by a Y-coordinate, and the calculating calculates the value indicated by the pointer of the measuring instrument based on a Y-coordinate of a minimum value that the measuring instrument indicates, a Y-coordinate of a maximum value that the measuring instrument indicates, and the Y-coordinate of the edge portion.

13. The method according to claim 8, further comprising:
presetting a number of edge portions to be detected; and
issuing notification if a number of detected edge portions is not equal to the preset number.

14. The method according to claim 13, further comprising changing the area within a range where the number of detected edge portions is equal to the preset number.

15. A non-transitory computer-readable storage medium storing a program of instructions for causing a computer to perform a method comprising:
acquiring an image of a measuring instrument that is captured by an imaging apparatus;
setting an area in the image as an edge detection processing target in response to a user operation;
executing edge detection processing on the set area in the image;
setting a value for correcting a position of a detected edge portion;
correcting the position of the detected edge portion based on the value; and
calculating a value indicated by a pointer of the measuring instrument according to the corrected position of the edge portion.

16. The non-transitory computer-readable storage medium according to claim 15, wherein the area is at least a portion of a torus, and the setting sets at least one of a center of the torus, a start side of the torus, an end side of the torus, a radius of an outer circle of the torus, and a radius of an inner circle of the torus.

17. The non-transitory computer-readable storage medium according to claim 16, wherein the position of the edge portion is indicated by an angle, and the calculating calculates the value indicated by the pointer of the measuring instrument based on an angle of a minimum value that the measuring instrument indicates, an angle of a maximum value that the measuring instrument indicates, and the angle of the edge portion.

18. The non-transitory computer-readable storage medium according to claim 15, wherein the area is a rectangle, and the setting sets opposite vertexes of the rectangle.

19. The non-transitory computer-readable storage medium according to claim 15, further comprising:
presetting a number of edge portions to be detected; and
issuing notification if a number of detected edge portions is not equal to the preset number.

20. The non-transitory computer-readable storage medium according to claim 19, further comprising changing the area within a range where the number of detected edge portions is equal to the preset number.

21. An apparatus comprising:
a processor; and
a memory storing a program which, when executed by the processor, causes the apparatus to:
acquire an image of a measuring instrument that is captured by an imaging apparatus;
set an area in the image as an edge detection processing target in response to a user operation;
execute edge detection processing on the set area in the image;
set a value for correcting a position of a detected edge portion;
correct the position of the detected edge portion based on the value; and
calculate a value indicated by a pointer of the measuring instrument according to the corrected position of the detected edge portion.

* * * * *